United States Patent [19]

Pope

[11] Patent Number: 4,499,845

[45] Date of Patent: Feb. 19, 1985

[54] HORN FOR USE IN TRANSMITTING ULTRASONIC VIBRATIONS

[75] Inventor: John R. Pope, Lutterworth, England

[73] Assignee: USM Corporation, Farmington, Conn.

[21] Appl. No.: 321,532

[22] Filed: Nov. 16, 1981

[30] Foreign Application Priority Data

Nov. 18, 1980 [GB] United Kingdom ................. 8036963

[51] Int. Cl.[3] .......................... B06B 3/00; B23K 1/06; B23K 5/20

[52] U.S. Cl. ............................... 116/137 A; 228/1 A; 228/1 R; 29/526 R; 156/580.2

[58] Field of Search ................ 116/137 A; 29/526 R; 156/580.2, 580.1; 228/1 A, 1 B, 1 R; 33/164 B; 134/1

[56] References Cited

U.S. PATENT DOCUMENTS

| | | | |
|---|---|---|---|
| Re. 28,642 | 12/1975 | Davis | 228/1 B |
| 3,419,447 | 12/1968 | Hewitt | 156/580.1 |
| 3,515,093 | 6/1970 | Greene | 116/137 A |
| 3,914,156 | 10/1975 | Batcher | 33/164 B |
| 3,991,478 | 11/1976 | Stone | 33/164 B |

FOREIGN PATENT DOCUMENTS

| | | | |
|---|---|---|---|
| 572506 | 3/1959 | Canada | 33/164 B |
| 1028259 | 5/1966 | United Kingdom . | |
| 1242603 | 8/1971 | United Kingdom . | |

*Primary Examiner*—Charles Frankfort
*Assistant Examiner*—Denis E. Corr
*Attorney, Agent, or Firm*—Donald N. Halgren

[57] ABSTRACT

The horn comprises a body portion, a detachable and hence replaceable end portion, and a securing member securing the end portion to the body portion. The securing member has a first threaded portion received in a tapped hole in the body portion and a second threaded portion received in a tapped hole in the end portion. By rotation of the first threaded portion in its tapped hole, the orientation of the end portion, when it is in tight contact with the body portion, can be corrected. A method of detachably securing an end portion to a body portion of a horn is also claimed.

11 Claims, 3 Drawing Figures

HORN FOR USE IN TRANSMITTING ULTRASONIC VIBRATIONS

FIELD OF THE INVENTION

This invention is concerned with a horn for use in transmitting ultrasonic vibrations to a workpiece and is especially concerned with such a horn which has a detachable, and hence replaceable, workpiece-engaging end portion.

PRIOR ART

Ultrasonic vibrations are used in various industries to produce localized heating of workpieces. For example, plastics workpieces may be welded together by applying ultrasonic vibrations to the point where the weld is required. In such applications, a transducer is used to cause a transmitting member called a horn to vibrate at the ultrasonic frequency and the horn has a workpiece-engaging end portion which is applied to the workpiece at the point where the localized heating is required. The end portion of the horn is shaped to correspond to the shape of the area where the localized is required.

The end portion of an ultrasonic horn is susceptable to wear to a greater or lesser extent depending on the particular application for which it is used. This wear eventually affects the performance of the horn to such an extent that it becomes unacceptable. It, therefore, becomes necessary to either replace the horn, which is undesirable because of the cost of such horns which have to be manufactured to high standards, or to replace the end portion. Replacement of the end portion has hitherto only been practical if the end portion possesses circular symmetry. This is because it would be difficult and, therefore, expensive to attach a new end portion by, for example, brazing or welding it to the remainder of the horn because it would be necessary to achieve a joint which is not only strong but would also transmit the ultransonic vibrations successfully. It has, however, been the practice, in the case of an end portion possessing circular symmetry, to set a threaded stud in the body portion of the horn and attach the end portion by inserting the threaded portion of the stud into a tapped hole in the end portion and rotating the end portion relative to the body portion until the end portion comes into tight contact with the body portion. It is found that, so long as sufficient torque is applied to the end portion to tighten it on the stud, the horn will operate successfully. However, this technique cannot be applied to end portions which do not possess circular symmetry because, after tightening, the orientation of the end portion, relative to the body portion of the horn, will almost certainly be incorrect. In passing, it may be noted that merely screwing an end portion of a horn to the body portion results in a horn which will not transmit ultrasonic vibrations successfully.

Its is an object of the present invention to provide a horn for use in transmitting ultrasonic vibrations having an end portion which can easily and inexpensively be replaced whether it possesses circular symmetry or not.

SUMMARY OF THE INVENTION

The invention provides a horn for use in transmitting ultrasonic vibrations to a workpiece comprising a body portion, a detachable workpiece-engaging end portion, and securing member arranged to detachably secure the end portion.to the body portion, the securing member comprising a first threaded portion received in a tapped hole in the body portion and rotatable therein to alter the orientation of the securing member relative to the body portion, and a second threaded portion of different pitch and/or handedness to the first threaded portion onto which the end portion has been rotated while the securing member was held against rotation relative to the body portion to bring the end portion into tight contact with the body portion with the second threaded portion being received into a tapped hole in the end portion, the arrangement being such that the orientation reached by the end portion relative to the body portion, when the end portion is in tight contact with the body portion, can be corrected by rotation of the securing member relative to the body portion.

In order to increase the accuracy with which the correction of the orientation of the end portion can be achieved, in a horn according to the last preceding paragraph, the second threaded portion is of greater pitch than the first threaded portion.

In order to accommodate a middle portion of the securing member which is between the first and the second threaded portions thereof, in a horn according to the last preceding paragraph but one, either the diameter of the first threaded portion is greater than that of the second threaded portion and the middle portion is accommodated in the tapped hole in the body portion, or the end portion has a recess in the surface thereof which contacts the body portion, the recess being arranged to accommodate the middle portion.

The invention also provides a method of detachably securing an end portion to a body portion of a horn for use in transmitting ultrasonic vibrations using a securing member having a first threaded portion and a second threaded portion of different pitch and/or handedness to the first threaded portion, the method comprising:

(i) inserting the first threaded portion into a tapped hole in the body portion, (ii) while holding the securing member against rotation relative to the body portion, rotating the end portion on to the second threaded portion so that the second threaded portion is received in a tapped hole in the end portion until the end portion comes into tight contact with the body portion, (iii) measuring the angle by which the orientation of the end portion relative to the body portion is incorrect, (iv) calculating the angle through which the securing member must be rotated relative to the body portion to correct the orientation of the end portion, (v) rotating the end portion relative to the body portion in the opposite sense to its previous rotation so as the remove the tight contact between the end portion and the body portion, (iv) rotating the securing member through the calculated angle, and (vii) rotating the end portion to bring it back into tight contact with the body portion.

BRIEF DESCRIPTION OF THE DRAWINGS

There now follows a detailed description to be read with reference to the accompanying drawings, of a horn for use in transmitting ultrasonic vibrations which is illustrative of the invention and of an illustrative method of detachably securing an end portion of the illustrative horn to a body portion thereof.

In the drawings.

DESCRIPTION OF THE PEFERRED EMBODIMENT

Figure 1:
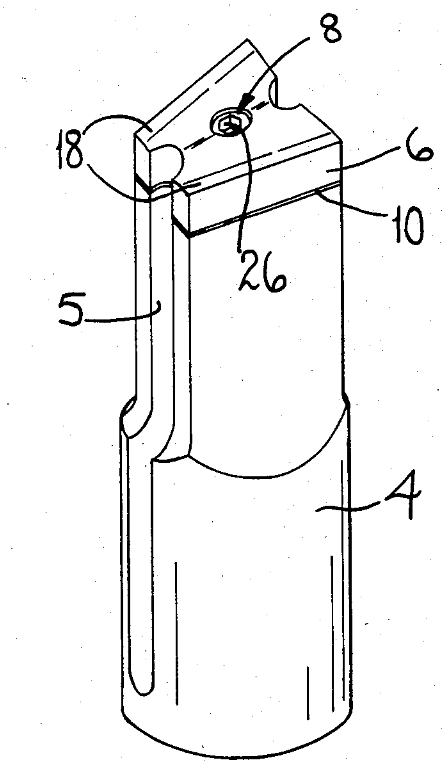
FIG. 1 is a perspective view of the illustrative horn.
Figure 2:
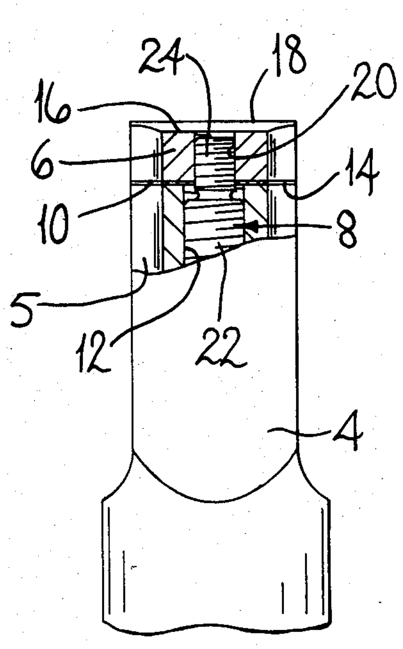
FIG. 2 is a side elevational view, partly in section, on a larger scale than FIG. 1, of an upper portion of the illustrative horn.
Figure 3:
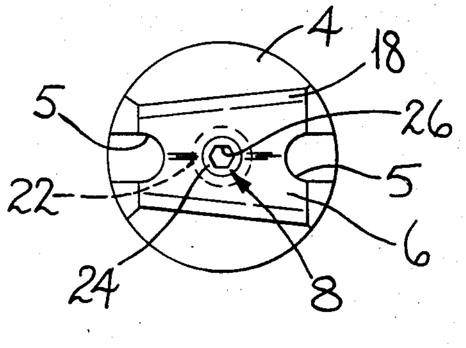
FIG. 3 is a plan view of the illustrative horn.

The illustrative horn as shown in FIG. 1, is for use in transmitting ultrasonic vibrations to a workpiece. The horn comprises a body portion 4, a detachable workpiece-engaging end portion 6, and a securing member 8 arranged to detachably secure the end portion 6 to the body portion 4. The body portion 4 has two longitudinally extending grooves 5 therein on opposite sides thereof but otherwise is generally cylindrical at its lower end, where it can be attached either to a transducer or to a cylindrical horn which is itself attached to a transducer. At its upper end, the horn is generally in the shape of a trapezium in cross-section except for the grooves 5, shown in FIGS. 1 and 3. The upper surface of the body portion 4 has a generally trapezium-shaped layer of copper 10 thereon which surface is contacted by the end portion 6, the layer 10 serving to improve the transmission of ultrasonic vibrations between the body portion 4 and the end portion 6. The body portion 4 has a tapped hole 12 extending longitudinally therein and passing centrally through the layer 10.

The end portion 6 is generally trapezium-shaped in cross-section and of the same size as the layer 10. The lower surface 14 of the end portion 6 is planar and arranged to make tight contact with the upper surface of the body portion 4. The upper surface 16 of the end portion 6 has a workpiece-engaging planar portion 18 adjacent each of its longer edges and is recessed between the portions 18. The end portion 6 is so shaped so that it can transmit ultrasonic vibrations to the opposite edges of the head of a fastener which has a generally trapezium-shaped head so that the fastener can be driven into a plastics workpiece. A tapped hole 20 passes through the end portion 6 which is arranged to communicate with the tapped hole 12 when the end portion 6 is positioned on the body portion 4 and which is of smaller diameter than the hole 12.

The securing member 8 comprises a first threaded portion 22 which is received in the tapped hole 12 in the body portion 4 and is rotatable therein to alter the orientation of the securing member 8 relative to the body portion 4. The securing member 8 also comprises a second threaded portion 24 of different pitch and/or handedness to the first threaded portion 22 and coaxial with the first threaded portion 22, on to which the end portion 6 has been rotated, while the securing member 8 was held against rotation relative to the body portion 4, to bring the end portion 6 into tight contact with the body portion 4, i.e. contact in which the end portion 6 and the body portion 4 engage one another with sufficient force to enable ultrasonic vibrations to be successfully transmitted from the body portion 4 to the end portion 6, with the second threaded portion 24 being received into the tapped hole 20 in the end portion 6. The securing member has a hexagonal (in cross-section) recess 26 extending from its end into the second threaded portion 24 thereof. The recess 26 is arranged to receive a tool, e.g. an Allen key, by which the securing member 8 can be rotated relative to the body portion 4 or can be held against rotation relative thereto.

The arrangement of the illustrative horn is such that, the orientation reached by the end portion 6 relative to the body portion 4, when the end portion 6 is in tight contact with the body portion 4, can be corrected by rotation of the securing member 8 relative to the body portion 4.

The first and second threaded portions 22 and 24 of the securing member 8 have threads of different pitch (pitch being the distance between successive crests of the thread) but are of the same handedness, both being right handed. The first threaded portion 22 has a smaller pitch than the thread of the second threaded portion 24. It is found that this arrangement increases the accuracy with which the correction of the orientation of the end portion 6 can be achieved and facilitates securing of the end portion 6 to the body portion 4. However, in variations of the illustrative horn, the pitches may be the same and the threads may be of opposite handedness.

In the illustrative horn, the diameter of the first threaded portion 22 of the securing member 8 is greater than that of the second threaded portion 24. This allows the middle portion of the securing member 8 which is between the threaded portions 22 and 24 to be accommodated in the tapped hole 12. However, in a variation of the illustrative horn in which the diameters of the portions 22 and 24 are the same, the end portion 6 has a recess in the lower surface 14 thereof, the recess being arranged to accommodate the middle portion of the securing member 8.

In the illustrative horn, the body portion 4, (except for the surface layer 10 thereof), the end portion 6, and the securing member 8 are all made of the same material, i.e. titanium, but this may not be so in variations of the illustrative horn.

There now follows a description of the illustrative method of detachably securing the end portion 6 of the illustrative horn to the body portion 4 thereof. In the illustrative method, the securing member 8 is used and the method comprises inserting the first threaded portion 22 into the tapped hole 12 in the body portion 4. Next, while holding the securing member 8 against rotation relative to the body portion 4 by means of an Allen key inserted in the slot 26, the method comprises rotating the end portion 6 on to the second threaded portion 24 so that the second threaded portion is received in the tapped hole 20 in the end portion 6 until the end portion 6 comes into tight contact with the body portion 4. The end portion 6 is tightened on to the body portion 4 by applying a suitable torque thereto (e.g. 60 Newton meters).

It will almost certainly be found that the end portion 6 is incorrectly oriented relative to the body portion 4. If this is the case, the illustrative method continues by measuring the angle by which the orientation of the end portion 6 relative to the body portion 4 is incorrect and then by calculating the angle through which the securing member 8 must be rotated relative to the body portion 4 to correct the orientation of the end portion 6. For example, if the handedness of the portions 22 and 24 is the same but the portion 22 has a pitch of 2.5 mm while the pitch of the portion 24 is 3 mm and the angle measured is 90°, the angle calculated will be 450°. Next, the illustrative method comprises rotating the end portion 6 relative to the body portion 4 in the opposite sense to its previous rotation so as to remove the tight contact between the end portion 6 and the body portion 4. It is not necessary to remove the end portion 6 from the second threaded portion 24. Next, the method comprises rotating the securing member 8 through the calculated angle and, finally, rotating the end portion 6 to bring it back into tight contact with the body portion 4, while again holding the securing member 8 against rotation. The same torque is applied to the end portion as was previously applied thereto and it should now be found that the end portion 6 is correctly orientated relative to the body portion 4.

I claim:

1. A horn for use in transmitting ultrasonic vibrations to a workpiece comprising:

a body portion a detachable workpiece-engaging non-circular end portion; and a securing member arranged to detachably secure the non-circular end portion to the body portion, the securing member comprising a first threaded portion received in a tapped hole in the body portion and rotatable therein to alter the orientation of the securing member relative to the body portion, and a second threaded portion of different pitch and/or handedness to the first threaded portion on to which the non-circular end portion has been rotated while the securing member was held against rotation relative to the body portion to bring the non-circular end portion into tight contact with the body portion with the second threaded portion being received into a hole tapped completely through the non-circular end portion, the arrangement being such that the orientation reached by the non-circular end portion, relative to the body portion, when the non-circular end portion is in tight contact with the body portion, can be corrected by rotation of the securing member relative to the body portion.

2. A horn as recited in claim 1, wherein said first and the second threaded portions of the securing member have threads which are of different pitch but the same handedness.

3. A horn as recited in claim 2, wherein the thread of the first threaded portion of the securing member has a smaller pitch than the thread of the second threaded portion of the securing member.

4. A horn as recited in claim 1, wherein the threads of the first and second threaded portions of the securing member are of opposite handedness

5. A horn as recited in claim 1, wherein the diameter of said first threaded portion of the securing member is greater than that of said second threaded portion thereof.

6. A horn as recited in claim 1, wherein said end portion has a recess in the surface thereof which contacts the body portion, said recess being arranged to accommodate a portion of the securing member between said first and second threaded portions thereof.

7. A horn as recited in claim 1, wherein said securing member, said body portion and said end portion are all made from the same material.

8. A horn as recited in claim 1, wherein said body portion has a layer of copper on the surface thereof which is contacted by the end portion.

9. A horn as recited in claim 6, wherein said securing member has a recess therein arranged to receive a tool by which said securing member can be rotated relative to the body portion or held against rotation relative thereto.

10. A method of detachably securing an end portion to a body portion of a horn for use in transmitting ultrasonic vibrations using a securing member having a first threaded portion and a second threaded portion of different pitch and/or handedness to the first threaded portion the method comprising:

(i) inserting the first threaded portion into a tapped hole in the body portion, (ii) while holding the securing member against rotation relative to the body portion, rotating the end portion on to the second threaded portion so that the second threaded portion is received in a tapped hole in the end portion until the end portion comes into tight contact with the body portion, (iii) measuring the angle by which the orientation of the end portion relative to the body portion is incorrect, (iv) calculating the angle through which the securing member must be rotated relative to the body portion to correct the orientation of the end portion, (v) rotating the end portion relative to the body portion in the opposite sense to its previous rotation so as to remove the tight contact between the end portion and the body portion, (iv) rotating the securing member through the calculated angle, and (vii) rotating the end portion to bring it back into tight contact with the body portion.

11. A method as recited in claim 10, wherein in steps (ii) and (vii) the same torque is applied to the end portion.

* * * * *